US012726882B2

(12) United States Patent
Wang et al.

(10) Patent No.: US 12,726,882 B2
(45) Date of Patent: Sep. 1, 2026

(54) LINK SWITCHING METHOD AND APPARATUS, LINK SWITCHING CONFIGURATION METHOD AND APPARATUS, COMMUNICATION NODE, AND MEDIUM

(71) Applicant: ZTE CORPORATION, Shenzhen (CN)

(72) Inventors: Mengzhen Wang, Shenzhen (CN); Lin Chen, Shenzhen (CN); Boyuan Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 540 days.

(21) Appl. No.: 17/904,033

(22) PCT Filed: Dec. 2, 2020

(86) PCT No.: PCT/CN2020/133342
§ 371 (c)(1),
(2) Date: Aug. 11, 2022

(87) PCT Pub. No.: WO2021/159823
PCT Pub. Date: Aug. 19, 2021

(65) Prior Publication Data

US 2023/0074899 A1 Mar. 9, 2023

(30) Foreign Application Priority Data

Feb. 13, 2020 (CN) ......................... 202010091485.5

(51) Int. Cl.
*H04W 40/12* (2009.01)
*H04B 17/309* (2015.01)
(Continued)

(52) U.S. Cl.
CPC .......... *H04W 40/36* (2013.01); *H04B 17/309* (2015.01); *H04W 36/0016* (2013.01);
(Continued)

(58) Field of Classification Search
None
See application file for complete search history.

(56) References Cited

U.S. PATENT DOCUMENTS 10,728,827 B2 * 7/2020 Xiao ..................... H04W 40/02
11,895,548 B2 * 2/2024 Xu .................... H04W 36/0085
(Continued)

FOREIGN PATENT DOCUMENTS

CN 101374325 A 2/2009
CN 103354653 A 10/2013
(Continued)

OTHER PUBLICATIONS

Second Japanese Office Action on JP Appl No. 2022-548790, mailed Sep. 26, 2023 (7 pages, including English translation).
(Continued)

*Primary Examiner* — Khaled M Kassim
*Assistant Examiner* — Shima Wasel
(74) *Attorney, Agent, or Firm* — Foley & Lardner LLP

(57) ABSTRACT

Provided are a path switching method and apparatus, a path switching configuration method and apparatus, a communication node and a non-transitory computer-readable storage medium. The path switching method is applied to a first user equipment (UE) and may include receiving path switching configuration information, and switching a communication link with a target node from a first link to a second link according to the path switching configuration information.

12 Claims, 5 Drawing Sheets

(51) Int. Cl.

*H04W 36/00* (2009.01)
*H04W 40/22* (2009.01)
*H04W 40/36* (2009.01)
*H04W 88/04* (2009.01)

(52) U.S. Cl.

CPC ..... *H04W 36/0058* (2018.08); *H04W 36/033* (2023.05); *H04W 40/12* (2013.01); *H04W 40/22* (2013.01); *H04W 88/04* (2013.01)

(56) References Cited

U.S. PATENT DOCUMENTS

2014/0135019 A1 5/2014 Jang et al.
2018/0213577 A1* 7/2018 Burbidge .............. H04W 76/10
2019/0037430 A1* 1/2019 Lee ..................... H04L 43/0882
2019/0037463 A1* 1/2019 Feng ..................... H04W 36/38
2019/0045405 A1 2/2019 Byun et al.
2019/0141771 A1* 5/2019 Ma ........................ H04W 76/27
2019/0261216 A1 8/2019 Lee et al.
2019/0281526 A1* 9/2019 Freda .................... H04W 36/03
2019/0313315 A1* 10/2019 Xu ........................ H04W 24/10
2019/0320495 A1* 10/2019 Kuang .............. H04W 36/0066
2019/0357101 A1* 11/2019 Stojanovski ........ H04W 36/302
2019/0380159 A1* 12/2019 Bangolae .............. H04W 4/023
2019/0387446 A1* 12/2019 Xu .................... H04W 36/0061
2020/0178155 A1* 6/2020 Xu ........................ H04W 72/21
2021/0105066 A1* 4/2021 Uchiyama ............. H04W 88/04
2021/0144606 A1* 5/2021 Xu ........................ H04W 76/10
2022/0330056 A1* 10/2022 Peng ..................... H04W 76/30
2022/0377822 A1* 11/2022 Wang .................... H04W 76/20
2023/0085018 A1* 3/2023 Liu ....................... H04W 76/14
370/329

FOREIGN PATENT DOCUMENTS

CN 105188099 A 12/2015
CN 108024295 A 5/2018
CN 108029148 A 5/2018
CN 110461020 A 11/2019
CN 111901836 A 11/2020
JP 2015-521455 A 7/2015
JP 2016-531506 A 10/2016
JP 2017-103750 A 6/2017
JP 2018-515969 A 6/2018
JP 2018-520525 A 7/2018
JP 2018-533311 A 11/2018
WO WO-2017/130593 A1 8/2017
WO WO-2017/160070 A1 9/2017
WO WO-2017/188304 A1 11/2017
WO WO-2018/006253 A1 1/2018
WO WO-2018/029930 A1 2/2018
WO 2018059126 A1 4/2018
WO WO-2019/061195 A1 4/2019

OTHER PUBLICATIONS

Communication pursuant to Article 94(3) EPC for EP Appl. No. 20918773.1, dated Sep. 27, 2024 (7 pages).
First Office Action for CN Appl. No. 202010091485.5, dated Jul. 23, 2024 (with English translation, 16 pages).
Huawei et al., "Path switch procedure between Uu and PC5", 3GPP TSG-RAN WG2 Meeting #98, R2-1704715, May 19, 2017, Hangzhou, China (5 pages).
Extended European Search Report for EP Appl. No. 20918773.1 dated Jan. 8, 2024 (7 pages).
Huawei, et al., "Solution for Key Issue #3: Service continuity via UE-to-Network Relay", SA WG2 Meeting #136AH, S2-2000492, Incheon, South Korea, Jan. 13, 2020 (7 pages).
International Searching Authority. International Search Report and Written Opinion for PCT Application No. PCT/CN2020/133342 and English translation, mailed Jan. 28, 2021, pp. 1-11.
First Japanese Office Action on JP Appl No. 2022-548790, mailed on Jun. 20, 2023 (14 pages).
Office Action for KR Appl. No. 10-2022-7029914, dated Nov. 22, 2024 (with English translation, 4 pages).

* cited by examiner

LINK SWITCHING METHOD AND APPARATUS, LINK SWITCHING CONFIGURATION METHOD AND APPARATUS, COMMUNICATION NODE, AND MEDIUM

CROSS-REFERENCE TO RELATED APPLICATION

This application is a national stage filing under 35 U.S.C. § 371 of international application number PCT/CN2020/133342, filed Dec. 2, 2020, which claims priority to Chinese patent application No. 202010091485.5, filed Feb. 13, 2020. The contents of these applications are incorporated herein by reference in their entirety.

TECHNICAL FIELD

The present disclosure relates to radio communication networks, for example, to a path switching method and apparatus, a path switching configuration method and apparatus, a communication node and a non-transitory computer-readable storage medium.

BACKGROUND

With the development of wireless multimedia services, people are demanding increasingly higher data rates and better user experience, as well as larger system capacity and coverage of wireless networks. Not only can a mobile terminal device communicate directly with a target node (such as a base station or other mobile terminal devices), but it can also realize data transmission with the target node through a sidelink-based relay, thus supporting a wider range of applications and services, expanding coverage and reducing power consumption. At present, there is a lack of efficient mechanisms to determine a communication link between the mobile terminal device and the target node, and the failure to adapt to different network conditions may result in business interruption, poor quality of service and low reliability of communication links.

SUMMARY

The present disclosure provides a path switching method and apparatus, a path switching configuration method and apparatus, a communication node and a non-transitory computer-readable storage medium, to improve the flexibility and reliability of radio communications.

An embodiment of the present disclosure provides a path switching method applied to a first user equipment (UE), including receiving path switching configuration information, and switching from a first link for communication with a target node to a second link according to the path switching configuration information.

A further embodiment of the present disclosure provides a path switching configuration method applied to a base station, including sending path switching configuration information to a first UE, and transmitting data with the first UE.

A further embodiment of the present disclosure provides a path switching apparatus, including a configuration information receiving module configured to receive path switching configuration information, and a path switching module configured to switch from a first link for communication with a target node to a second link according to the path switching configuration information.

A further embodiment of the present disclosure provides a path switching configuration apparatus, including a configuration information sending module configured to send path switching configuration information to a first UE, and a data transmission module configured to transmit data with the first UE.

A further embodiment of the present disclosure provides a communication node, including: at least one processor; and a storage apparatus, configured to store at least one program. The at least one program, when executed by the at least one processor, causes the at least one processor to implement the path switching method or the path switching configuration method described above.

A further embodiment of the present disclosure provides a non-transitory computer-readable storage medium storing a computer program, where the computer program, when executed by a processor, causes the processor to implement the path switching method or the path switching configuration method described above.

DETAILED DESCRIPTION

Figure 1:
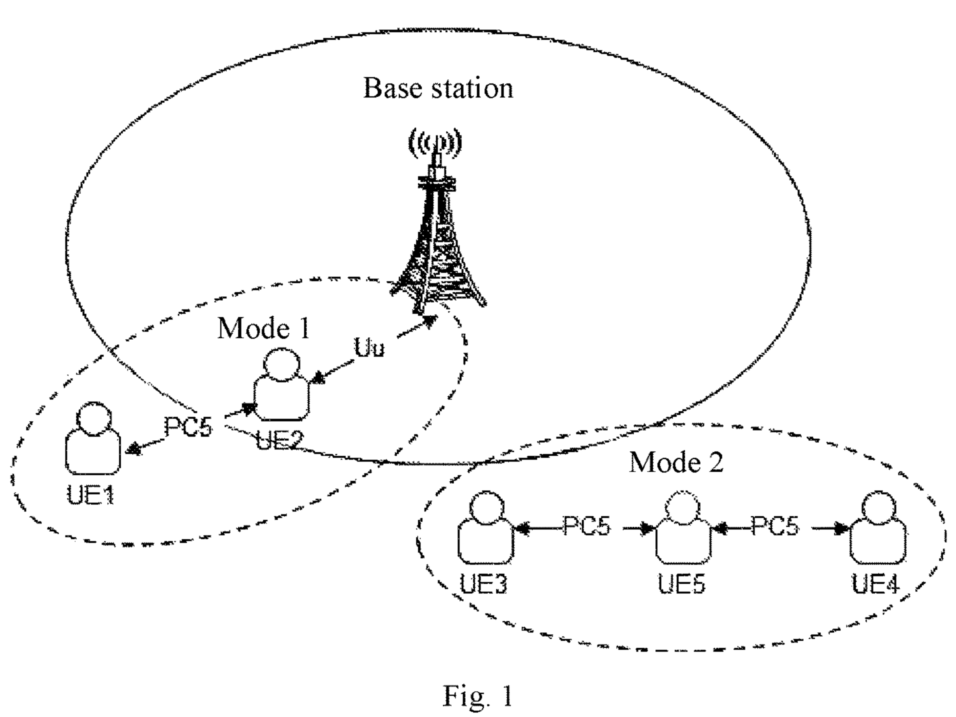
FIG. 1 is a schematic diagram of a communication link in a radio communication system.

The present disclosure will be described hereinafter with reference to the drawings and embodiments. It can be understood that the specific embodiments described herein are only used to explain the present disclosure and are not intended to limit the present disclosure. It should be noted that any combinations of embodiments and features of the embodiments of the present disclosure without conflict are possible. In addition, it should be further noted that for ease of description, only a part and not all structures related to the present disclosure are shown in the drawings.

In a radio communication system, a traditional base station-centered cellular network has obvious limitations in terms of support for high data rate services and proximity services, which leads to the emergence of the Device-to-Device (D2D) communication technology. UE not only communicates directly with a target node (such as a base station or other mobile terminal devices), but also realizes data transmission with the target node through a sidelink-based relay, thus supporting a wider range of applications and services, expanding coverage and reducing power consumption, improving the robustness of network infrastructure, and meeting the requirements of high data rate services and proximity services. The D2D technology is also called proximity services (ProSe) or sidelink (SL) communication. An interface between devices is a sidelink PC5 interface.

FIG. 1 is a schematic diagram of a communication link in a radio communication system.

As shown in FIG. 1, sidelink relay communication is mainly applied to two application scenarios. (1) UE-to-base station relay transmission. UE relay transmission in an area with weak coverage or no coverage, as shown in Mode 1 in FIG. 1, allows UE1 with poor signal quality or no network coverage to communicate with a network through UE2 with network coverage nearby, so that operators can expand coverage and improve capacity. Here, UE2 is a relay, and this process is UE-to-network relay. (2) UE-to-UE relay transmission. For example, when a cellular network fails due to an earthquake or other emergencies, or in order to expand a sidelink communication range, devices are allowed to communicate through relay UE. As shown in Mode 2 in FIG. 1, data communication between UE3 and UE4 is realized through UE5 or multi-hop relay UE. Here, UE5 is a relay, and this process is UE-to-UE relay.

At present, there is a lack of efficient mechanisms to determine a communication link between UE and a target node, and the failure to adapt to different network conditions may result in business interruption, poor service quality and low communication link reliability.

Long Term Evolution (LTE) provides two technical schemes of UE-to-Network relay based on Internet Protocol (IP) layer 3 and access layer 2. Relay transmission of layer 3 (IP layer) is data forwarding according to a destination IP address/port number and other information. Relay transmission of layer 2 (access layer) is routing forward of control plane and user plane data in the access layer by relay UE, which allows operators (i.e., core network elements and base stations) to manage remote UE more efficiently. New Radio (NR) sidelink communication and LTE sidelink communication are quite different in the aspects like frame structure, QoS processing, bearer configuration and establishment, etc. The technical scheme of LTE-based sidelink relay transmission is not suitable for 5G or NR systems.

In an embodiment of the present disclosure, there is provided a path switching method, by which a first UE (i.e., remote UE) switches between links according to path switching configuration information, so as to adapt to actual network situations, ensure the continuity of business services, and improve the reliability of communication links.

Figure 2:
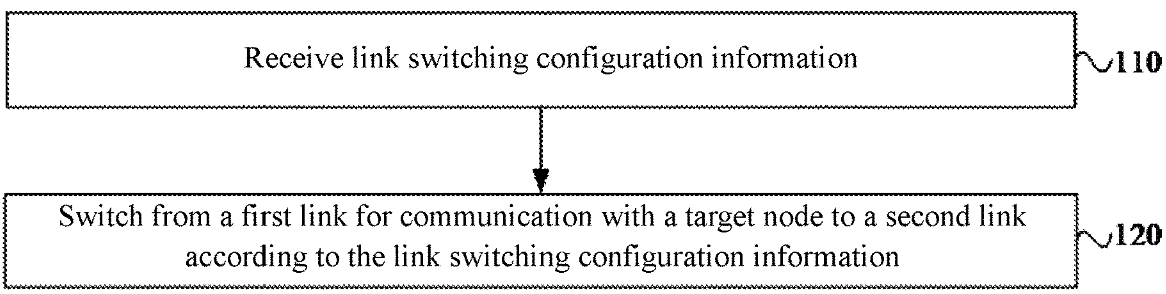
FIG. 2 is a flowchart of a path switching method according to an embodiment.

FIG. 2 is a flowchart of a path switching method according to an embodiment. The method in this embodiment can be applied to a first UE (denoted as UE1). As shown in FIG. 2, the method provided in this embodiment includes step 110 and step 120.

At step 110, path switching configuration information is received.

At step 120, switching from a first link for communication with a target node to a second link is performed according to the path switching configuration information.

In this embodiment, path switch (or path switch) includes the following situations.

Situation 1: Switch from direct Uu link to relay communication based on a PC5 or SL interface. In this case, UE1 is in a radio resource control (RRC) connection status, and directly communicates with a target node through a first link before switch. In response to the deterioration of Uu channel quality, UE1 determines a relay and switches to a second link, and in the second link, data are forwarded to the target node through the relay, where a base station of the UE1 and a base station of the relay may be the same base station or different base stations.

Situation 2: Switch from relay communication based on a PC5 or SL interface to direct communication with a target node. In this case, before switch, UE1 communicates with a network through a relay. In response to the UE1 entering the coverage of a base station and establishes RRC connection, a service forwarded through the relay can be forwarded to a Uu link and directly transmitted to a base station, where a base station of the UE1 and a base station of the relay may be the same base station or different base stations.

Situation 3: Switch between relay communication links. In this case, relay reselection occurs, and a relay connected to UE1 changes. For example, before switch, the UE1 communicates with a base station through a first relay, after switch, the UE1 communicates with the base station through a second relay, and a service forwarded through the first relay is switched to a link forwarded through the second relay, where the base station corresponding to the first relay and the base station corresponding to the second relay may be the same station or different ones.

In this embodiment, the UE1 can realize direct link or relay communication path switch, or relay reselection in response to poor signal quality of a current link or a change in the coverage of the base station, so as to efficiently forward data through the relay and improve the flexibility and reliability of communication links.

In an embodiment, the path switching configuration information includes at least one of path switching criteria or switching instruction information.

In this embodiment, the target node sends the path switching criteria to the UE1, the UE1 decides whether to perform path switch according to the path switching criterion, or the target node sends the switching instruction information to the UE1 to instruct the UE1 to perform path switch. The path switching configuration information is configured by the target node, or pre-configured by a system or defined by a protocol.

In an embodiment, switching from a first link for communication with a target node to a second link according to the path switching configuration information includes at least one of: notifying the target node in response to the path switching criteria being met, and switching from the first link to the second link according to the switching instruction information configured by the target node; switching from the first link to the second link according to the switching instruction information configured by the target node; and switching from the first link to the second link in response to the path switching criteria being met.

In this embodiment, the path switching criteria can be configured by the target node and sent to the UE1, the UE1 notifies the target node upon detecting that the path switching criteria are met, and the target node makes a decision and sends the switching instruction information to instruct the UE1 to or not to perform path switch; or the UE1 measures the channel quality, type of service (ToS), etc. according to a measurement configuration configured by the target node and reports a result to the target node, and the target node makes a decision and sends the switching instruction information to instruct the UE1 to or not to perform path switch; or the target node configures or pre-configures the path switching criteria, and the UE1 performs switch upon detecting that the path switching criteria are met.

In an embodiment, the switching instruction information includes at least one of: a switching instruction; a relay identifier; a ToS for switching; a protocol data unit (PDU) session identifier for switching; a data radio bearer (DRB) for switching; quality of service (QoS) flow information for switching; or a DRB packet data convergence protocol (PDCP) retransmission instruction.

In an embodiment, the first link is a link for direct communication with the target node, the second link is a link for communication with the target node through a relay, and the target node is a base station. The path switching criteria include at least one of: a first threshold of link quality of the first link; a first preset ToS; or a threshold of PC5 interface link quality of the second link.

In an embodiment, the path switching criteria are met when at least one of the following conditions is met: the link quality of the first link being lower than the first threshold of the link quality; a ToS of the first link being the first preset ToS; or the PC5 interface link quality of the second link being higher than the threshold of the PC5 interface link quality of the second link.

In this embodiment, for the above Situation 1, in response to the link quality of the first link (Uu link) being lower than the first threshold of the link quality of the first link (for a Uu interface link), switching to the second link can be performed, where the first threshold of the link quality may include a certain hysteresis value; in response to the ToS of the first link being the first preset ToS (for example, data of some types of services need to be transmitted through a PC5 interface), switching to the second link can be performed; and in response to the link quality of the second link (PC5 link) being higher than the threshold of the PC5 interface link quality of the second link, switching to the second link can be performed, for example, path switch can be performed if link quality of a PC5 interface between UE1 and relay UE is higher than the threshold of the PC5 interface link quality of the second link. In this process, the UE1 can measure the first link and the second link separately.

In an embodiment, the first link is a link for communication with the target node through a relay, the second link is a link for direct communication with the target node, and the target node is a base station.

In an embodiment, the path switching criteria include at least one of: a second threshold of link quality of the second link; a threshold of PC5 interface link quality of the first link; a third threshold of link quality between the relay and the base station; a first channel busy ratio (CBR) threshold; or a second CBR threshold.

In an embodiment, the path switching criteria are met when at least one of the following conditions is met: the link quality of the second link being higher than the second threshold of the link quality; the PC5 interface link quality of the first link being lower than the threshold of the PC5 interface link quality of the first link; the link quality between the relay and the base station being lower than the third threshold of the link quality; a CBR of any resource pool of a PC5 interface of the first link being higher than the first CBR threshold; or an average CBR of all resource pools of the PC5 interface of the first link being higher than the second CBR threshold.

In this embodiment, for the above Situation 2, in response to the link quality of the second link (PC5 link) being higher than the second threshold of the link quality of the second link, switching to the second link can be performed, where the second threshold of the link quality may include a certain hysteresis value; in response to the PC5 interface link quality of the first link (Uu link) being lower than the threshold of the PC5 interface link quality of the first link (for example, the PC5 interface link quality between UE1 and the relay is lower than the threshold of the PC5 interface link quality of the first link), switching to the second link can be performed; in response to the link quality between the relay and the base station being lower than the third threshold of the link quality, switching to the second link can be performed. Optionally, the relay informs the UE1 of the link quality between the relay and the base station through a PC5 RRC signaling message, or informs the UE1 of a level indication of the link quality between the relay and the base station (for example, indicating that the link quality is above or below the third threshold of the link quality, or the quality is excellent, medium or poor); in response to the CBR of the resource pool of the PC5 interface of the first link being higher than the first CBR threshold, switching to the second link can be performed; in response to the average CBR of all the resource pools of the PC5 interface of the first link being higher than the second CBR threshold, switching to the second link can be performed, for example, if the CBR of the resource pool of the PC5 interface of the first link or the average CBR of all the resource pools of the PC5 interface of the first link is higher than the threshold, it is indicated that a load of relay transmission is increasing, so switching to direct communication with the base station can be performed; and in response to the ToS of the first link being the second preset ToS (for example, data of some types of services need to be transmitted through a Uu interface), switching to the second link can be performed.

In this embodiment, the link quality of the Uu link is measured reference signal received power (RSRP) or reference signal received quality (RSRQ) of a Uu interface, and the PC5 link quality is measured RSRP, RSRQ or received signal strength indication (RSSI) of an SL discovery channel or communication channel.

In an embodiment, the path switching method further includes: transmitting a foremost data packet that is not acknowledged by the relay and data packets succeeding the foremost data packet through the second link.

In this embodiment, for the above Situation 2, in the process of path switch, once the relay fails to acknowledge a data packet, the data packet and subsequent data packets are transmitted through the second link, thus ensuring the continuity of business services. When the UE1 switches from the relay communication link to the direct communication link, a relay protocol stack is end-to-end PDCP and hop-by-hop radio link control (RLC).

Figure 3:
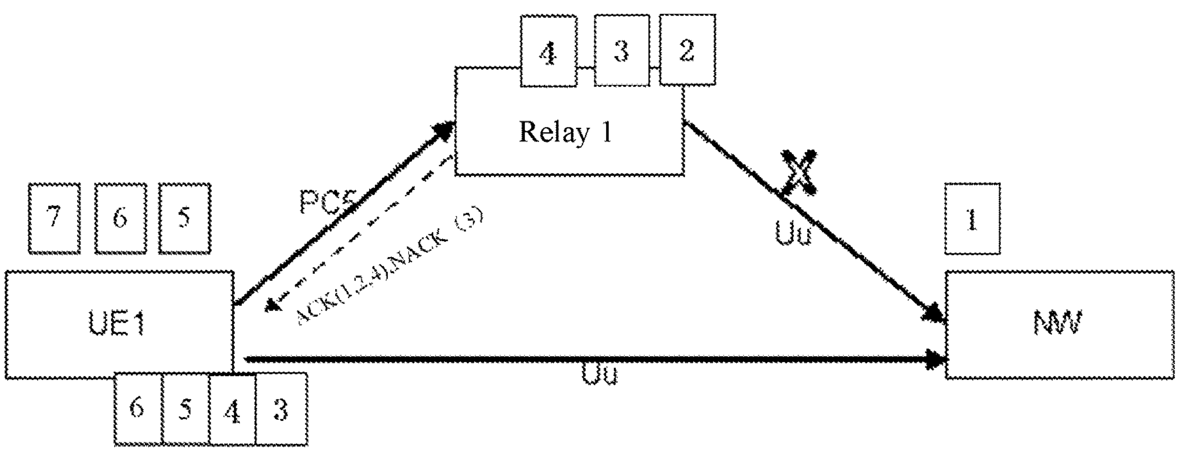
FIG. 3 is a schematic diagram of uplink data packet transmission according to an embodiment.

FIG. 3 is a schematic diagram of uplink data packet transmission according to an embodiment. Taking uplink packet transmission as an example, as shown in FIG. 3, UE1 has submitted packets 1, 2, 3, and 4 to a PC5 interface for transmission to a relay 1. The PC5 interface adopts RLC acknowledgement mode (AM mode) transmission, and the UE1 receives a packets 1, 2, and 4 acknowledgement indication and a packet 3 unacknowledgement indication sent by the relay. In this case, if path switch is performed, the UE1 performs PDCP data recovery and submits the first packet (packet 3) not acknowledged by the relay and subsequent packets to a Uu interface for direct transmission to the base station (NW). The relay will continue to send the packets 1, 2, and 4 to the base station, and the base station receives the packets 1, 2, and 4 forwarded by the relay and packets 3, 4, 5, 6, . . . sent by the UE1 through the Uu interface, performs duplicate packet detection, discards a duplicate packet (packet 4), and performs PDCP reordering, so as to sequentially submit the packets to an upper layer.

In an embodiment, the path switching method further includes: receiving a first PDCP status report sent by the base station; and retransmitting the data packets not received successfully indicated in the first PDCP status report and/or transmitting new data through the second link according to the first PDCP status report.

In this embodiment, the first PDCP status report indicates the data packets not received successfully, which are retransmitted to avoid packet loss. In response to there being no unsuccessfully received data packets in the first PDCP status report, new data can be transmitted.

In an embodiment, the path switching method further includes: receiving first instruction information of a relay, the first instruction information including at least one of: radio link failure (RLF) indication information; and sequence numbers of first target data packets; and transmitting the first target data packets through the second link according to the first instruction information; where, the first target data packets include data packets not forwarded to the base station by the relay and/or data packets not acknowledged by the base station.

In this embodiment, for the above Situation 2, in the process of path switch, once the relay fails to acknowledge a data packet, the data packet and subsequent data packets are transmitted through the second link. However, if the quality of the Uu link between the relay and the base station suddenly deteriorates or RLF occurs after the relay sends the packet 1 to the base station, and the packets 2 and 4 are still cached in the relay but not sent to the base station (as shown in FIG. 3), because the first packet submitted to the Uu interface for transmission by the UE1 is the packet 3, packet loss will occur, and the base station fails to receive the packet 2. In this case, this embodiment adopts the following methods to ensure lossless transmission between the UE1 and the base station during path switch.

Method One: The relay initiates RRC connection re-establishment to the base station, and proceeds to send the packet 2 to the base station after the re-establishment. In this case, the RRC re-establishment has a serious delay or the re-establishment may fail.

Method Two: In response to the UE1 instructing the base station to perform path switch or the base station making a decision to instruct the UE1 to perform path switch, the base station sends the first PDCP status report for uplink data to the UE1 through the Uu interface, and the UE1 retransmits the unacknowledged data packets indicated in the first PDCP status report. The acknowledged data packets do not need to be sent repeatedly, and new data can be transmitted next. Optionally, in order to avoid repeated packet transmission, after sending the first PDCP status report, the base station may initiate the release of RRC connection with the relay, or instruct the relay not to forward the packets of the UE1 anymore.

Method Three: In response to the relay detecting that RLF occurs at the Uu interface with the base station, the relay sends instruction information to the UE1 through a PC5 RRC message, and informs the UE1 of sequence numbers of data packets at the relay which have not been forwarded to the base station or have been forwarded but no acknowledgement feedback indication is received from the base station. In some embodiments, the instruction information of the PC5 RRC message sent by the relay to the UE1 includes at least one of: an RLF indication; sequence numbers (PDCP SN) of the data packets which have not been forwarded to the base station, which may be the smallest PDCP SN or COUNT values in ascending order; or PDCP SNs of the data packets which have been forwarded but no acknowledgement feedback indication is received from the base station, which may be the smallest PDCP SN or COUNT values in ascending order, in which case, the relay can identify the PDCP SN in a PDCP header.

In an embodiment, the path switching method further includes: sending a second PDCP status report to the base station; and receiving the new data transmitted by the base station through the second link and/or the data packets retransmitted by the base station and not acknowledged by the first UE, and receiving the data packets not successfully received indicated in the second PDCP status report and retransmitted by the base station through the second link and/or the new data.

In an embodiment, the path switching method further includes: receiving second target data packets transmitted by the base station, where sequence numbers of the second target data packets are indicated to the base station by the relay; and the second target data packets include the data packets not forwarded to the first UE by the relay and/or the data packets not acknowledged by the first UE.

Figure 4:
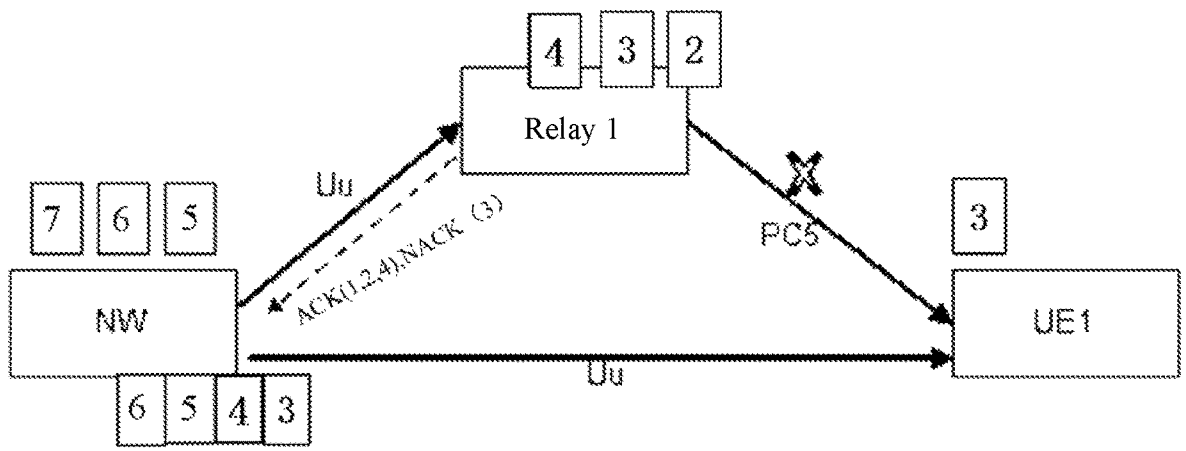
FIG. 4 is a schematic diagram of downlink data packet transmission according to an embodiment.

FIG. 4 is a schematic diagram of downlink data packet transmission according to an embodiment. As shown in FIG. 4, packet loss may also occur in the transmission of downlink data. After the relay (relay 1) sends the packet 1 to the UE1, the quality of the PC5 link between the relay and the UE1 suddenly deteriorates or RLF occurs, and the packets 2 and 4 are still cached in the relay and not sent to the UE1, because the first packet submitted to the Uu interface for transmission by the base station is the packet 3, packet loss will occur, and the UE1 fails to receive the packet 2. In this case, this embodiment adopts the following methods to ensure lossless transmission between the base station and the UE1 during path switch.

Method One: In response to the UE1 instructing the base station to perform path switch or the base station making a decision to instruct the UE1 to perform path switch, the UE1 sends a PDCP status report for downlink data to the base station through the Uu interface, and the base station retransmits the unacknowledged data packets indicated in the PDCP status report. The acknowledged data packets do not need to be sent repeatedly.

Method Two: In response to the relay detecting that RLF occurs at the PC5 interface with the UE1, the relay sends instruction information to the base station through an RRC message (such as FailureInformation, or sidelinkUEInformation, or other uplink RRC messages), and informs the base station of PDCP SNs of data packets at the relay which have not been forwarded to the UE1 or have been forwarded but no acknowledgement feedback indication is received from the UE1.

Figure 5:
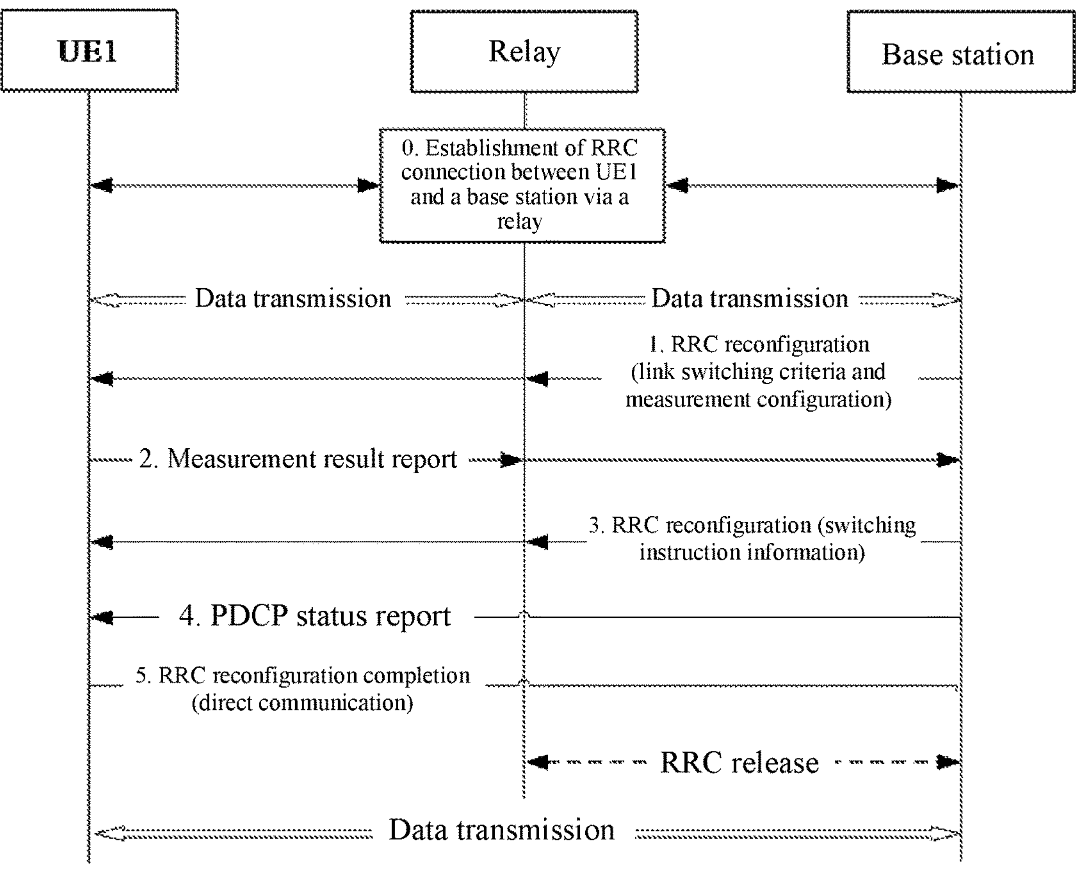
FIG. 5 is a schematic diagram of the implementation of path switching according to an embodiment.

FIG. 5 is a schematic diagram of the implementation of path switching according to an embodiment. As shown in FIG. 5, the UE1 has established RRC connection with the base station through the relay, and forwarded data through the relay. The base station sends the path switching criteria and/or measurement configuration to the UE1 through an RRC reconfiguration message (forwarded by the relay). The UE1 performs Uu interface measurement and PC5 interface measurement based on the measurement configuration, and reports measurement results to the base station according to measurement reporting conditions. Based on the measurement results reported by the UE1, the base station determines whether to perform path switch. In response to performing path switch, path switching configuration information (including switching instruction information) is sent to the UE1 through an RRC reconfiguration message (forwarded through the relay or directly sent through the Uu interface). In some embodiments, the path switching configuration information may include at least one of: a path switching instruction, a ToS for switching, a PDU session identifier for switching, a DRB for switching, QoS flow information for switching such as QoS flow identifier (QFI), a 5G QoS identifier (5QI), Uu RLC bearer configuration information associated with the DRB, a DRB PDCP retransmission indication, or SRB-associated Uu RLC bearer configuration information, etc. In some embodiments, the UE1 can determine whether to perform path switch according to the measurement results and path switching criteria, and send a path switching notification to the base station in response to performing path switch; and the base station configures a DRB-associated Uu RLC bearer through the RRC reconfiguration message, optionally including the DRB PDCP retransmission indication. On this basis, the base station can send the first PDCP status report to the UE1, so as to indicate whether there are unacknowledged data packets, the UE1 retransmits these data packets if yes, and the UE1 transmits new data otherwise, thus ensuring lossless transmission.

In an embodiment, the first link is a link for communication with the target node through a first relay, the second link is a link for communication with the target node through a second relay, and the target node is a second UE (denoted as UE2).

Figure 6:
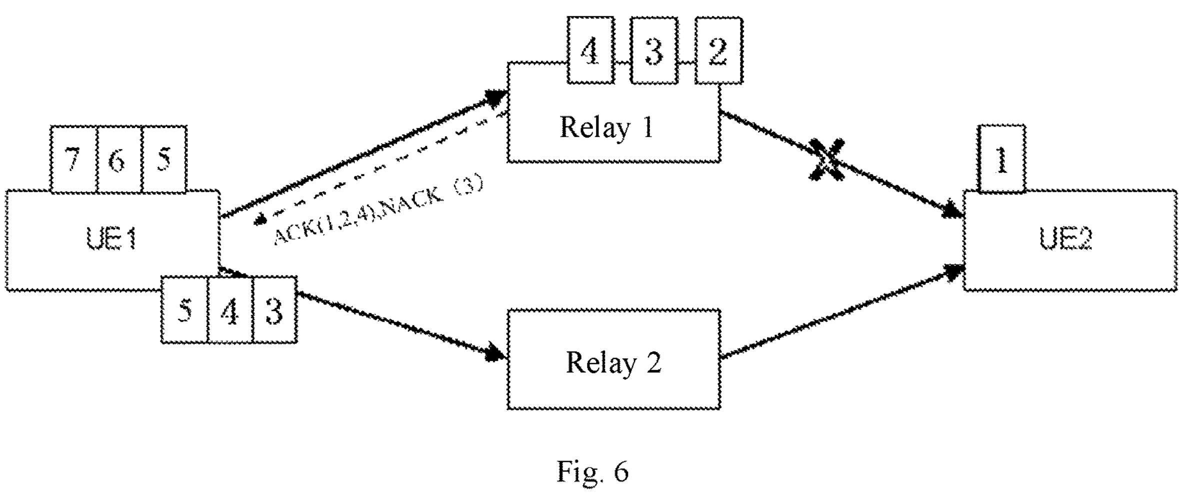
FIG. 6 is a schematic diagram of switching a communication link with UE according to an embodiment.

FIG. 6 is a schematic diagram of switching a communication link with UE according to an embodiment. As shown in FIG. 6, the UE1 and UE2 establish unicast connection and forward data through an L2 first relay (relay 1). The UE1 and the UE2 maintain the end-to-end PC5-S/PC5-RRC and end-to-end service data adaptation protocol (SDAP) or PDCP, and forward data through a PC5 backhaul (BH) RLC bearer with the relay 1. Because of the poor quality of a PC5 link (between the UE1 and the relay 1 or between the relay 1 and the UE2) or a heavy load on a path via the relay 1, the UE1 or the UE2 reselects the second relay (relay UE2) for data forwarding.

In the process of switching from the link of the relay 1 to the link of the relay 2, as shown in FIG. 6, the UE1 has submitted the packets 1, 2, 3, and 4 to the PC5 interface for transmission to the relay 1, the PC5 interface adopts RLC AM mode transmission, and the UE1 receives a packets 1, 2, and 4 acknowledgement indication and a packet 3 unacknowledgement indication sent by the relay 1. In this case, if path switch is performed, the UE1 can perform PDCP data recovery and submit the first unacknowledged packet (packet 3) and subsequent packets to the Uu interface for transmission. The relay 1 proceeds to send the packets 1, 2, and 4 to the UE2. The UE2 receives the packets 1, 2, and 4 forwarded by the relay 1 and packets 3, 4, 5, 6 . . . forwarded by the UE1 through the relay 2. The UE2 performs duplicate packet detection, discards the duplicate packet 4, performs PDCP reordering, and submits the data packets to the upper layer in sequence.

In an embodiment, the path switching criteria include at least one of: a fourth threshold of link quality of the first link; a switch indication of a first relay; or a link status indication between the first relay and the second UE; where the link status indication includes at least one of: a link release indication; a radio link failure (RLF) indication; a link quality indication; and a link congestion indication.

In this embodiment, the fourth threshold of the link quality of the first link refers to a quality threshold of a PC5 link between the first UE and the first relay UE. When the UE1 detects that the quality of the PC5 link with the relay 1 is lower than the configured or pre-configured fourth threshold of the link quality of the first link, or the UE1 receives an L2 link release message sent by the relay 1 or an indication of no longer acting as a relay, or the UE1 receives link instruction information between the relay 1 and the target UE2 (such as an L2 link release indication, an RLF failure indication, an indication of the link quality being lower than the configured or pre-configured threshold or a link congestion indication, etc.) sent by the relay 1, the UE1 triggers relay reselection.

In an embodiment, the path switching method further includes: transmitting a foremost data packet that is not acknowledged by the first relay and data packets succeeding the foremost data packet through the second link.

In this embodiment, in the case of relay reselection, in the process of path switch, once the first relay fails to acknowledge a data packet, the data packet and subsequent data packets are transmitted through the second link, thus ensuring the continuity of business services.

In an embodiment, the path switching method further includes: receiving a third PDCP status report sent by the second UE; and retransmitting the data packets not received successfully by the second UE indicated in the third PDCP status report and/or transmitting new data through the second link according to the third PDCP status report.

In an embodiment, the path switching method further includes: receiving second instruction information of the first relay, the second instruction information including at least one of: RLF indication information; or sequence numbers of third target data packets; and transmitting the third target data packets through the second link according to the second instruction information, the third target data packets including the data packets not forwarded to the second UE by the first relay and/or the data packets not acknowledged by the second UE.

In an embodiment, a fourth target forwards fourth target data packets to the second UE from the first relay through a third link; and the fourth target data packets include the data packets not forwarded to the second UE by the first relay and/or the data packets not acknowledged by the second UE.

In an embodiment, the path switching method further includes: receiving a first RLC status report sent by the first relay; and transmitting fifth target data packets according to the first RLC status report; where the first RLC status report is determined by the first relay based on a second RLC status report sent by the second UE to the first relay; and the fifth target data packets include unacknowledged data packets indicated in the first RLC status report.

In this embodiment, as shown in FIG. 6, after the relay 1 sends the packet 1 to the UE2, the quality of the PC5 link between the relay 1 and the UE2 suddenly deteriorates or RLF occurs, and the packets 2 and 4 are still cached in the relay 1 and not forwarded to the UE2, because the first packet submitted to the relay 2 for transmission by the UE1 is the packet 3, packet loss will occur, and the UE2 fails to receive the packet 2. In this case, this embodiment adopts the following methods to ensure lossless transmission between the UE1 and the UE2 during path switch.

Method One: After the link of the relay 2 is activated, the UE2 sends the third PDCP status report to the UE1 via the relay 2, and the report indicates that the packet 2 and subsequent packets are not received (the packet 1 has been received). Therefore, the UE1 transmits the packet 2 and subsequent packets via the link of the relay 2 based on the third PDCP status report. Optionally, in order to avoid repeated packet transmission, after sending the third PDCP status report, the UE2 may initiate the release of connection with the relay 1 or instruct the relay 1 not to forward the data of the UE1 anymore.

Method Two: In response to the relay 1 detecting that the PC5 link with the UE2 is broken or RLF occurs, the relay 1 sends instruction information to the UE1 through a PC5 RRC message, informing the UE1 of the RLF on the PC5 link with the UE2, and PDCP SNs of data packets at the relay 1 which have not been forwarded or have been forwarded but no acknowledgement feedback indication is received from the UE2. After the UE1 receives the information, the UE1 transmits the packets with the PDCP SNs indicated by the relay 1 and subsequent packets via the link of the relay 2. In some embodiments, the PC5 RRC instruction information sent by the relay 1 to the UE1 includes at least one of: a PC5 RLF indication; PDCP SNs of the data packets which have not been forwarded to the second UE (UE2), which may be the smallest PDCP SN or COUNT values in ascending order; or PDCP SNs of the data packets which have been forwarded but no acknowledgement feedback indication is received from the base station, which may be the smallest PDCP SN or COUNT values in ascending order. In this case, the first relay can identify PDCP SNs in a PDCP header.

Method Three: The relay 1 looks for another path to the UE2, that is, a third link, and forwards the cached data to the UE2 through the third link. For example, upon finding that a relay 3 can be connected to the UE2, the relay 1 forwards the data packets which have not been forwarded or have been forwarded but not acknowledged to the relay 3, which are then forwarded to the UE2; or the UE1 informs the relay 1 of the selected relay 2 through the PC5 RRC message, the relay 1 tries to connect to the relay 2, and then sends the data packets which have not been forwarded or have been forwarded but not acknowledged to the relay 2 for forwarding to the UE2 if connection succeeds.

Method Four: End-to-end RLC automatic repeat-request (ARQ) is supported between the UE1 and the UE2, and a PDCP layer performs retransmission based on RLC feedback. For example, after receiving the packets 1, 2 and 4 sent by the UE1 (the packet 3 has not been received yet), instead of sending feedback information of RLC acknowledgement (ACK) or negative-acknowledgment (NACK) to the UE1, the relay 1 forwards the data packets to the UE2, and after receiving RLC ACK/NACK feedback information sent by the UE2, sends the RLC ACK/NACK feedback information to the UE1. In response to the relay 1 failing to receive an acknowledgement indication for the forwarded data packets within a certain period of time or before RLF occurs on the link, the RLC ACK/NACK feedback information sent by the relay 1 to the UE1 includes a last data packet acknowledged by the UE2 and data packets which have not been acknowledged before. Since the relay 1 performs RLC SN repacking on the received data packets when forwarding the data packets, this method requires the relay 1 to keep the mapping relationship between the RLC SNs of the received (Ingress Link) data packets and the repacked RLC SNs during forwarding (Egress Link). Therefore, the relay 1 obtains the RLC SNs on the Ingress Link by an inverse method based on the acknowledged RLC SNs on the Egress Link, and then sends the RLC ACK/NACK to the UE1 on the Ingress Link.

Figure 7:
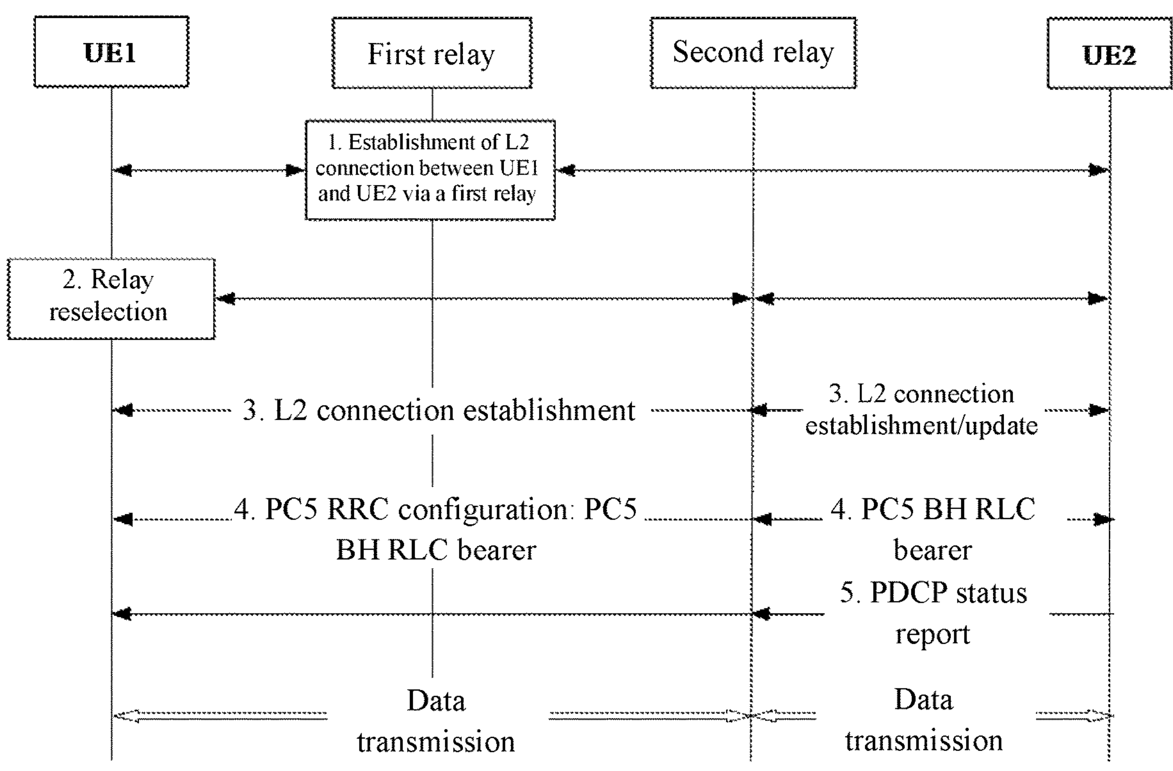
FIG. 7 is a schematic diagram of the implementation of path switching according to another embodiment.

FIG. 7 is a schematic diagram of the implementation of path switching according to another embodiment. As shown in FIG. 7, the UE1 reselects the second relay and establishes L2 link connection with the second relay. Optionally, the second relay establishes/updates an L2 link with the UE2. The UE1 interacts with the second relay in terms of a PC5 BH RLC bearer configuration for data forwarding, and the mapping relationship between an end-to-end sidelink radio bearer (SLRB) and the new PC5 BH RLC bearer between the UE1 and the UE2. Optionally, the UE1 carries the end-to-end SLRB QoS in the PC5 RRC message to notify the second relay; and the second relay interacts with the UE2 in terms of the PC5 BH RLC bearer configuration for data forwarding, and the UE1, the second relay and the UE2 establish a PC5 BH RLC bearer based on configuration information. The UE2 sends the third PDCP status report to the UE1 via the second relay, for example, the report indicates that the packet 2 and subsequent packets are not received (the packet 1 has been received). The UE1 performs retransmission based on the third PDCP status report, and the data packet (such as packet 2) unacknowledged by the UE2 and subsequent packets are transmitted through the second relay link, thus ensuring lossless transmission and service continuity in the process of path switch.

In an embodiment, the path switching method further includes: reporting path switching notification information to the target node.

The path switching notification information includes at least one of: a path switching instruction; a ToS for switching; a PDU session identifier for switching; a DRB for switching; QoS flow information for switching; DRB-associated RLC bearer configuration information; and a relay identifier.

In this embodiment, the UE1 notifies the base station after path switch, and reports the path switching notification information to the base station.

In an embodiment, before switching from the first link to the second link, the path switching method further includes: acquiring serving cell information of the relay, the serving cell information including at least one of: an evolved UMTS terrestrial radio access network (E-UTRAN) cell global identifier (ECGI); a new radio cell global identifier (NCGI); a base station (gNB) identifier; a global base station (gNB) identifier; or single network slice selection assistance information (S-NSSAI).

In an embodiment, the path switching method further includes: before switching from the first link to the second link, the path switching method further includes: reporting relay-associated information to the target node, the relay-associated information including at least one of: a relay identifier; serving cell information of a relay; or measurement information of the relay. The measurement information includes at least one of: PC5 RSRP; or PC5 RSRQ and PC5 RSSI.

In an embodiment, the first link is a link for direct communication with the target node, and the target node is a source base station; and the second link is a link for communication with the target base station through a relay.

In an embodiment, the source base station is configured to send a switch request message to the target base station.

The switch request message includes at least one of: a first UE identifier; a cell radio network temporary identifier (C-RNTI) for the first UE, QoS flow to DRB mapping, and quality of service parameters for QoS flow; or a relay identifier.

In an embodiment, the target base station is also configured to send a path switch request to a core network element and indicate the relationship between the relay and the first UE. The path switch request includes at least one of: a relay identifier; a relay indication; or a first UE identifier.

In this embodiment, the relay identifier refers to an identifier of the relay UE L2, and the relay indication means that the first UE itself is relay UE.

Figure 8:
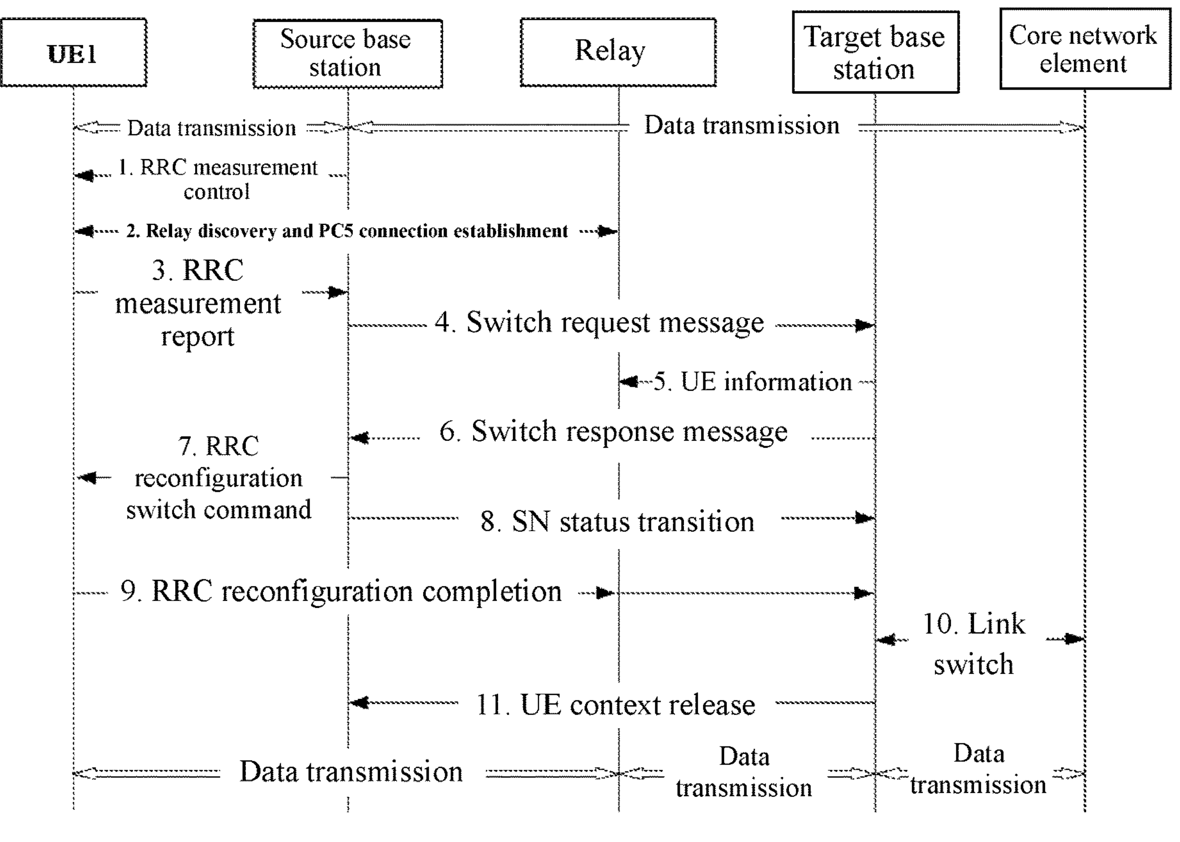
FIG. 8 is a schematic diagram of the implementation of path switching according to yet another embodiment.

FIG. 8 is a schematic diagram of the implementation of path switching according to yet another embodiment. As shown in FIG. 8, the UE1 is connected to a base station 1 (source base station) and communicates with the source base station through a Uu interface. In response to deterioration of the quality of a Uu link of the UE1, the UE1 discovers and selects a relay, and communicates with a network through the relay, where a base station of the relay is different from that of the UE1, and the relay is connected to the target base station.

As shown in FIG. 8, the process of switching from a communication link of the source base station to a link of the target base station is as follows.

At step 1, the UE1 receives RRC reconfiguration and/or measurement configuration information sent by the source base station. Here, the measurement configuration information includes Uu interface measurement configuration and/or sidelink measurement configuration (or PC5/relay measurement configuration). The sidelink measurement configuration includes at least one of: a relay measurement indication, PC5 interface RSRP, PC5 interface RSRQ, PC5 interface RSSI, or measurement information. The measurement information includes: PC5 RSRP/RSRQ/RSSI measurement values, a relay identifier, and a relay serving cell identifier.

At step 2, the UE1 discovers and measures the quality of the PC5 link with the relay. Relay serving cell information obtained by the UE1 includes any of the following information: an ECGI, an NCGI, a gNB identifier, a global gNB identifier, and an S-NSSAI. Here, the UE1 can receive the serving cell information sent by the relay by finding an advertisement message, a reception message or an additional message.

At step 3, the UE1 reports the measurement result information to the base station according to the measurement configuration, where the measurement result information includes at least one of: PC5 RSRP, PC5 RSRQ, and PC5 RSSI measurement values, a relay identifier, and relay serving cell information. The source base station receives the measurement result information, makes a judgment, and decides to switch to the communication link of the relay.

At step 4, the source base station sends a switch request message to the target base station (that is, a serving base station of the relay), which includes at least one of: a relay identifier, a relay C-RNTI, QoS flow and DRB mapping, and QoS flow service quality parameters; or a relay indication. The relay identifier (or remote UE identifier) is UE L2 ID.

At step 5, the target base station instructs the relay to forward data for the UE1, specifically including at least one of: a relay forwarding indication, a UE1 identifier, Uu relay BH bearer configuration, or SL BH bearer configuration; and the relay establishes a relay forwarding bearer and replies with a response message.

At step 6, the target base station sends a switch response message to the source base station, where a switch command includes at least one of: SL BH bearer configuration, or the mapping relationship between a Uu DRB and an SL BH bearer.

At step 7, the source base station receives the switch response message and forwards the switch command to the UE1. Optionally, the UE1 interacts with the relay in terms of the SL BH bearer configuration through PC5 RRC signaling.

At step 8, sequence number status switching is performed, that is, the conversion of sequence numbers of data packets.

At step 9, the UE1 performs configuration, connects to the target base station through the relay, and then sends a reconfiguration completion message to the target base station.

At step 10, the target base station sends a path switch request to a core network element (such as an access and mobility management function (AMF)) and indicates the relationship between the relay and the UE1. The path switch request message includes: a relay identifier, a relay indication and/or a UE1 identifier. The target base station receives the path switch response message.

At step 11, after path switch is completed, the target base station instructs the source base station to release context information of the UE1. Then, the UE1 communicates with the network through the relay.

The path switching method of this embodiment realizes the switch between the direct communication link and the relay communication link, the reselection of the relay, and the switch of the communication link from the source base station to the target base station, and can adapt to various actual network states, so as to ensure service continuity. In addition, lossless data transmission between the first UE and the target node is ensured by processing packet loss data, so that radio communication quality and reliability are improved.

A further embodiment of the present disclosure provides a path switching configuration method. By sending path switching configuration information to a first UE, a base station instructs the first UE to perform path switch, and then transmits data with the first UE, which can adapt to various actual network states, so as to ensure service continuity.

Figure 9:
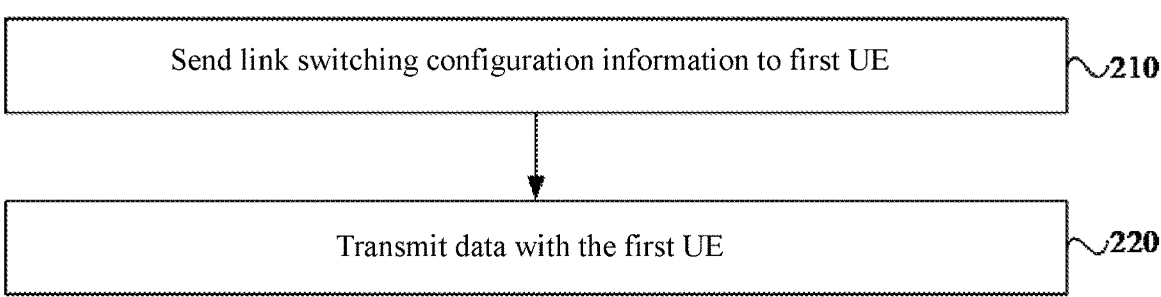
FIG. 9 is a flowchart of a path switching configuration method according to an embodiment.

FIG. 9 is a flowchart of a path switching configuration method according to an embodiment. The path switching configuration method of this embodiment can be applied to a base station, and the operation performed by the base station corresponds to that in the path switching method applied to the first UE in the above embodiments, which can be used as a reference in case some technical details are not described in the following embodiments.

As shown in FIG. 9, the method provided in this embodiment includes step 210 and step 220.

At step 210, path switching configuration information is sent to a first UE.

At step 220, data are transmitted with the first UE.

In an embodiment, the path switching configuration information includes at least one of: path switching criteria; and switching instruction information.

The switching instruction information includes at least one of: a switching instruction; a relay identifier; a ToS for switching; a PDU session identifier for switching; a DRB for switching; QoS flow information for switching; or a DRB PDCP retransmission indication.

In an embodiment, transmitting data with the first UE includes:

transmitting a foremost data packet that is not acknowledged by the relay and data packets succeeding the foremost data packet through the second link.

In an embodiment, the path switching configuration method further includes:

sending a first PDCP status report; and receiving unsuccessfully received data packets and/or new data indicated in the first PDCP status report.

In an embodiment, the path switching configuration method further includes:

receiving a second PDCP status report; and transmitting new data and/or retransmitting unsuccessfully received data packets indicated in the second status report according to the second PDCP status report.

In an embodiment, the path switching configuration method further includes:

receiving first instruction information of a relay, the first instruction information including at least one of: RLF indication information; and sequence numbers of first target data packets; and receiving the first target data packets through the second link.

Here, the first target data packets include data packets not forwarded to the base station by the relay and/or data packets not acknowledged by the base station.

In an embodiment, the path switching configuration method further includes:

sending second target data packets, where sequence numbers of the second target data packets are indicated by the relay, and the second target data packets include the data packets not forwarded to the first UE by the relay and/or the data packets not acknowledged by the first UE.

In an embodiment, the path switching configuration method further includes:

receiving relay-associated information, the relay-associated information including at least one of: a relay identifier; serving cell information of a relay; or measurement information of the relay.

The measurement information includes at least one of: PC5 RSRP; or PC5 RSRQ and PC5 RSSI.

In an embodiment, the path switching configuration method further includes:

sending a switch request message to a target base station.

The switch request message includes at least one of: a first UE identifier; a C-RNTI for the first UE, QoS flow to DRB mapping, and quality of service parameters for QoS flow; or a relay identifier.

Figure 10:
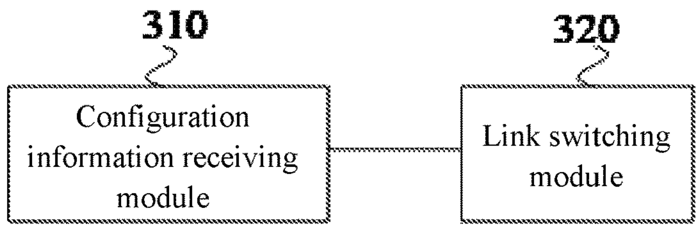
FIG. 10 is a schematic diagram of a path switching apparatus according to an embodiment.

A further embodiment of the present disclosure provides a path switching apparatus. FIG. 10 is a schematic diagram of a path switching apparatus according to an embodiment. As shown in FIG. 10, the path switching apparatus includes: a configuration information receiving module 310 and a path switching module 320.

The configuration information receiving module 310 is configured to receive path switching configuration information; and the path switching module 320 is configured to switch from a first link for communication with a target node to a second link according to the path switching configuration information.

The path switching apparatus of this embodiment switches between links according to the path switching configuration information, so as to adapt to actual network situations, ensure the continuity of business services, and improve the reliability of communication links.

In an embodiment, the path switching configuration information includes at least one of path switching criteria or switching instruction information.

In an embodiment, the path switching module 320 is specifically configured to perform at least one of the following steps:

notifying the target node in response to the path switching criteria being met, and switching from the first link to the second link according to the switching instruction information configured by the target node;

switching from the first link to the second link according to the switching instruction information configured by the target node; or switching from the first link to the second link in response to the path switching criteria being met.

In an embodiment, the switching instruction information includes at least one of: a switching instruction; a relay identifier; a ToS for switching; a PDU session identifier for switching; a DRB for switching; QoS flow information for switching; or a DRB PDCP retransmission indication.

In an embodiment, the first link is a link for direct communication with the target node, the second link is a link for communication with the target node through a relay, and the target node is a base station.

The path switching criteria include at least one of: a first threshold of link quality of the first link; a first preset ToS; or a threshold of PC5 interface link quality of the second link.

In an embodiment, the path switching criteria are met when at least one of the following conditions is met:

the link quality of the first link being lower than the first threshold of the link quality;

a ToS of the first link being the first preset ToS; or the PC5 interface link quality of the second link being higher than the threshold of the PC5 interface link quality of the second link.

In an embodiment, the first link is a link for communication with the target node through a relay, the second link is a link for direct communication with the target node, and the target node is a base station.

In an embodiment, the path switching criteria include at least one of: a second threshold of link quality of the second link; a threshold of PC5 interface link quality of the first link; a third threshold of link quality between the relay and the base station; a first channel busy ratio (CBR) threshold; or a second CBR threshold.

In an embodiment, the path switching criteria are met when at least one of the following conditions is met: the link quality of the second link being higher than the second threshold of the link quality; the PC5 interface link quality of the first link being lower than the threshold of the PC5 interface link quality of the first link; the link quality between the relay and the base station being lower than the third threshold of the link quality; a CBR of any resource pool of a PC5 interface of the first link being higher than the first CBR threshold; or an average CBR of all resource pools of the PC5 interface of the first link being higher than the second CBR threshold.

In an embodiment, the path switching apparatus further includes:

a first packet transmission module, configured to transmit a foremost data packet that is not acknowledged by the first relay and data packets succeeding the foremost data packet through the second link.

In an embodiment, the path switching apparatus further includes:

a first reporting module configured to receive a first PDCP status report sent by the base station; and a first transmission module configured to retransmit the data packets not received successfully by the base station indicated in the first PDCP status report and/or transmitting new data through the second link according to the first PDCP status report.

In an embodiment, the path switching apparatus further includes:

a first instruction module configured to receive first instruction information of a relay, the first instruction information including at least one of: RLF indication information; or sequence numbers of first target data packets; and a second transmission module configured to transmit the first target data packets through the second link according to the first instruction information.

Here, the first target data packets include data packets not forwarded to the base station by the relay and/or data packets not acknowledged by the base station.

In an embodiment, the path switching apparatus further includes:

a second reporting module configured to send a second PDCP status report to the base station; and a third transmission module configured to receive the data packets not successfully received indicated in the second PDCP status report and retransmitted by the base station through the second link and/or the new data.

In an embodiment, the path switching apparatus further includes:

a fourth transmission module configured to receive second target data packets transmitted by the base station.

Here, sequence numbers of the second target data packets are indicated to the base station by the relay; and the second target data packets include the data packets not forwarded to the first UE by the relay and/or the data packets not acknowledged by the first UE.

In an embodiment, the first link is a link for communication with the target node through a first relay, the second link is a link for communication with the target node through a second relay, and the target node is a second UE.

In an embodiment, the path switching apparatus further includes:

a second packet transmission module, configured to transmit a foremost data packet that is not acknowledged by the first relay and data packets succeeding the foremost data packet through the second link.

In an embodiment, the path switching apparatus further includes:

a third reporting module configured to receive a third PDCP status report sent by the second UE; and a fifth transmission module configured to retransmit the data packets not received successfully by the second UE indicated in the third PDCP status report and/or transmitting new data through the second link according to the third PDCP status report.

In an embodiment, the path switching apparatus further includes:

a second instruction module configured to receive second instruction information of the first relay, the second instruction information including at least one of: RLF indication information; and sequence numbers of third target data packets; and a sixth transmission module configured to transmit the third target data packets through the second link according to the second instruction information, the third target data packets including the data packets not forwarded to the second UE by the first relay and/or the data packets not acknowledged by the second UE.

In an embodiment, a fourth target forwards fourth target data packets to the second UE from the first relay through a third link; and the fourth target data packets include the data packets not forwarded to the second UE by the first relay and/or the data packets not acknowledged by the second UE.

In an embodiment, the path switching apparatus further includes:

a report receiving module configured to receive a first RLC status report sent by the first relay; and a seventh transmission module configured to transmit fifth target data packets according to the first RLC status report.

Here, the first RLC status report is determined by the first relay based on a second RLC status report sent by the second UE to the first relay; and the fifth target data packets include unacknowledged data packets indicated in the first RLC status report.

In an embodiment, the path switching criteria include at least one of: a fourth threshold of link quality of the first link; a switch indication of a first relay; or a link status indication between the first relay and the second UE; Here, the link status indication includes at least one of: a link release indication; a radio link failure (RLF) indication; a link quality indication; or a link congestion indication.

In an embodiment, the path switching apparatus further includes:

a notification module configured to report path switching notification information to the target node.

The path switching notification information includes at least one of: a path switching instruction; a ToS for switching; a PDU session identifier for switching; a DRB for switching; QoS flow information for switching; DRB-associated RLC bearer configuration information; or a relay identifier.

In an embodiment, the first link is a link for direct communication with the target node, and the target node is a source base station; and the second link is a link for communication with the target base station through a relay.

In an embodiment, the path switching apparatus further includes:

an acquisition module configured to acquire serving cell information of the relay before switching from the first link to the second link, the serving cell information including at least one of: an ECGI; an NCGI; a base station identifier; a global base station identifier; or S-NSSAI.

In an embodiment, the path switching apparatus further includes:

a reporting module configured to report relay-associated information to the source base station before switching from the first link to the second link, the relay-associated information including at least one of: a relay identifier; serving cell information of a relay; or measurement information of the relay.

The measurement information includes at least one of: PC5 RSRP; or PC5 RSRQ and PC5 RSSI.

In an embodiment, the source base station is configured to send a switch request message to the target base station.

The switch request message includes at least one of: a first UE identifier; a C-RNTI for the first UE, QoS flow to DRB mapping, and quality of service parameters for QoS flow; or a relay identifier.

In an embodiment, the target base station is also configured to send a path switch request to a core network element and indicate the relationship between the relay and the first UE.

The path switch request includes at least one of: a relay identifier; a relay indication; or a first UE identifier.

The path switching apparatus proposed in this embodiment and the path switching method proposed in the above embodiment are based on the same inventive concept. For technical details not described in detail in this embodiment, reference may be made to any of the foregoing embodiments, and this embodiment has the same beneficial effects as performing the path switching method.

Figure 11:
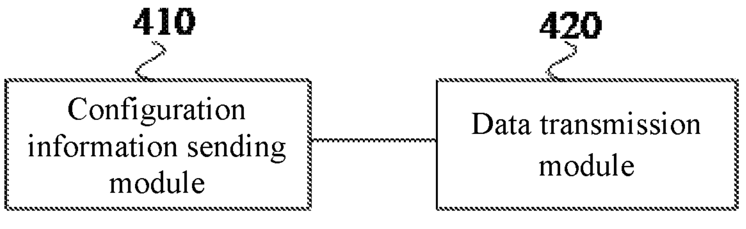
FIG. 11 is a schematic diagram of a path switching configuration apparatus according to an embodiment.

A further embodiment of the present disclosure provides a path switching configuration apparatus. FIG. 11 is a schematic diagram of a path switching configuration apparatus according to an embodiment. As shown in FIG. 11, the path switching configuration apparatus includes: a configuration information sending module 410 and a data transmission module 420.

The configuration information sending module 410 is configured to send path switching configuration information to a first UE; and the data transmission module 420 is configured to transmit data with the first UE.

According to the path switching configuration apparatus of the embodiment, by sending path switching configuration information to a first UE, a base station instructs the first UE to perform path switch, and then transmits data with the first UE, which can adapt to various actual network states, so as to ensure service continuity.

In an embodiment, the path switching configuration information includes at least one of: path switching criteria; and switching instruction information.

The switching instruction information includes at least one of: a switching instruction; a relay identifier; a ToS for switching; a PDU session identifier for switching; a DRB for switching; QoS flow information for switching; or a DRB PDCP retransmission indication.

In an embodiment, the data transmission module 420 is specifically configured to:

transmitting a foremost data packet that is not acknowledged by the relay and data packets succeeding the foremost data packet through the second link.

In an embodiment, the path switching configuration apparatus further includes:

a report sending module configured to send a first PDCP status report; and a packet receiving module configured to receive unsuccessfully received data packets and/or new data indicated in the first PDCP status report.

In an embodiment, the path switching configuration apparatus further includes:

a report receiving module configured to receive a second PDCP status report; and a packet sending module configured to transmit new data and/or retransmitting unsuccessfully received data packets indicated in the second status report according to the second PDCP status report.

In an embodiment, the path switching configuration apparatus further includes:

an instruction information receiving module configured to receive first instruction information of a relay, the first instruction information including at least one of: RLF indication information; and sequence numbers of first target data packets; and an eighth transmission module configured to receive the first target data packets through the second link.

Here, the first target data packets include data packets not forwarded to the base station by the relay and/or data packets not acknowledged by the base station.

In an embodiment, the path switching configuration apparatus further includes:

a ninth transmission module configured to send second target data packets, where sequence numbers of the second target data packets are indicated by the relay, and the second target data packets include the data packets not forwarded to the first UE by the relay and/or the data packets not acknowledged by the first UE.

In an embodiment, the path switching configuration apparatus further includes:

an associated information receiving module configured to receive relay-associated information, the relay-associated information including at least one of: a relay identifier;

serving cell information of a relay; and measurement information of the relay.

The measurement information includes at least one of: PC5 RSRP; and PC5 RSRQ and PC5 RSSI.

In an embodiment, the path switching configuration apparatus further includes:

a request module configured to send a switch request message to a target base station.

The switch request message includes at least one of: a first UE identifier; a C-RNTI for the first UE, QoS flow to DRB mapping, and quality of service parameters for QoS flow; or a relay identifier.

The path switching configuration apparatus proposed in this embodiment and the path switching configuration method proposed in the above embodiment are based on the same inventive concept. For technical details not described in detail in this embodiment, reference may be made to any of the foregoing embodiments, and this embodiment has the same beneficial effects as performing the path switching configuration method.

A further embodiment of the present disclosure provides a communication node. The path switching method can be executed by a path switching apparatus, which can be implemented by software and/or hardware and integrated in the communication node, which is a base station. Alternatively, the path switching configuration method can be executed by a path switching configuration apparatus, which can be implemented by software and/or hardware and integrated in the communication node, which is a UE.

Figure 12:
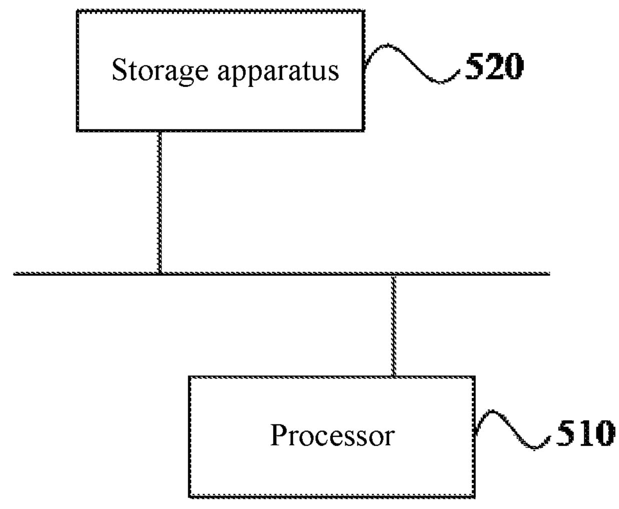
FIG. 12 is a schematic diagram of a hardware structure of a communication node according to an embodiment.

FIG. 12 is a schematic diagram of a hardware structure of a communication node according to an embodiment. As shown in FIG. 12, this embodiment provides a communication node, including: a processor 510 and a storage apparatus 520. There may be one or more processors in the communication node. In FIG. 12, one processor 510 is shown as an example. The processor 510 and the storage apparatus 520 in the device may be connected by a bus or by other means. In FIG. 12, the connection is realized by a bus as an example.

The at least one program, when executed by the at least one processor 510, causes the at least one processor to implement the path switching method or the path switching configuration method according to any one of the foregoing embodiments.

The storage apparatus 520 in the communication node, as a computer-readable storage medium, can be used to store at least one program, which may be a software program, a computer-executable program, or modules, such as program instructions/modules (for example, the modules in the path switching apparatus shown in FIG. 10, including the configuration information receiving module 310 and the path switching module 320) corresponding to the path switching method in the embodiments of the present invention. The processor 510 executes various functional applications and data processing of the communication node by running the software program, instructions and modules stored in the storage apparatus 520, that is, implements the path switching method or the path switching configuration method in the foregoing method embodiment.

The storage apparatus 520 mainly includes a storage program area and a storage data area, where the storage program area may store an operating system and application program(s) required by at least one function, and the storage data area can store data created according to the use of a device (such as the path switching configuration information, data packets and the like in the above embodiments). In addition, the storage apparatus 520 may include a high-speed random access memory and a non-volatile memory, for example, at least one magnetic disk storage device, a flash memory device, or another non-volatile solid-status storage device. In some examples, the storage apparatus 520 may further include memories remotely located with respect to the processor 510, and these remote memories may be connected to communication nodes via a network. Examples of the above-mentioned network include the Internet, an intranet, a local area network, a mobile communication network, and a combination thereof.

In addition, the at least one program included in the communication node, when executed by the at least one processor 510, causes the following operations to be implemented: receiving path switching configuration information; and switching from a first link for communication with a target node to a second link according to the path switching configuration information.

Alternatively, the at least one program included in the communication node, when executed by the at least one processor 510, causes the following operations to be implemented: sending path switching configuration information; and transmitting data with UE through a communication link with the UE.

The communication mode proposed in this embodiment and the path switching method and path switching configuration method proposed in the above embodiments are based on the same inventive concept. For technical details not described in detail in this embodiment, reference may be made to any of the foregoing embodiments, and this embodiment has the same beneficial effects as performing the path switching method and path switching configuration method.

A further embodiment of the present disclosure provides a storage non-transitory computer-readable storage medium including computer-executable instructions which, when executed by a computer processor, cause the computer processor to perform a path switching method or path switching configuration method.

Through the description of the above embodiments, those of ordinary skill in the art can understand that the present disclosure may be implemented by means of software and general-purpose hardware, or may be implemented by hardware. Based on this understanding, the technical schemes of the present disclosure may be embodied in the form of software products, which may be stored in a computer-readable storage medium (such as a floppy disk, read-only memory (ROM), random access memory (RAM), flash, hard disk and optical disk) and include instructions to cause a computer device (such as a personal computer, a server, or a network device) to perform the methods of the embodiments of the present disclosure.

The above-described embodiments are only example embodiments of the present disclosure, and are not intended to limit the scope of protection of the present disclosure.

The block diagram of any logic process in the drawings of the present disclosure may represent program steps, or may represent interconnected logic circuits, modules and functions, or may represent a combination of program steps and logic circuits, modules and functions. The computer program may be stored in a memory. The memory may be of any type that is suitable for a local technical environment and can be implemented using any suitable data storage technology, for example but not limited to, a read-only memory (ROM), a random-access memory (RAM), optical storage devices and systems (a digital versatile disk (DVD) or a compact disk (CD)). The computer-readable medium may include a non-transitory storage medium. The data processor may be any type suitable for the local technical environment, for example but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

By way of illustrative and non-limiting examples, a detailed description of the illustrative embodiments of the present disclosure has been provided above. However, when considered in connection with the drawings and claims, it is obvious to those skilled in the art that various modifications and adjustments can be made to the above embodiments without departing from the scope of the present disclosure. Therefore, the appropriate scope of the present disclosure will be determined according to the claims.

The invention claimed is:

1. A path switching method, applied to a first user equipment (UE), comprising:

receiving serving cell information of a relay;

sending, to a base station, a message including relay-associated information comprising a relay identifier, the serving cell information of the relay, and measurement information of the relay, the measurement information comprising a PC5 reference signal received power (RSRP);

receiving path switching configuration information from the base station, wherein the path switching configuration information comprises path switching criteria and switching instruction information, the path switching criteria comprising at least one of a first threshold of link quality of a first link and a threshold of PC5 interface link quality of a second link, the switching instruction information comprising the relay identifier; and switching a communication link with the base station from the first link to the second link in response to the path switching criteria being met, wherein the first link is for direct communication with the base station and the second link is for communication with the base station through the relay, wherein the path switching criteria being met comprises at least one of the link quality of the first link being lower than the first threshold of the link quality or the PC5 interface link quality of the second link being higher than the threshold of the PC5 interface link quality of the second link.

2. The path switching method of claim 1, wherein the switching instruction information comprises at least one of handover indication, a type of service (ToS) for switching, a protocol data unit (PDU) session identifier for switching, a data radio bearer (DRB) for switching, a handover quality of service (QoS) flow information for switching, or a DRB packet data convergence protocol (PDCP) retransmission instruction.

3. The path switching method of claim 1, wherein the path switching criteria further includes a type of service (ToS) of the first link.

4. The path switching method of claim 3, wherein the path switching criteria is met when the ToS of the first link is a first preset service type.

5. The path switching method of claim 1, wherein the serving cell information comprises at least one of an evolved UMPTS terrestrial radio access network (E-UTRAN) cell global identifier (ECGI), a new radio cell global identifier (NCGI) of a new air interface cell, a base station identifier, a global base station identifier, or a single network slice selection assistance information (S-NSSAI).

6. The path switching method of claim 1, wherein the measurement information further comprises a PC5 reference signal received quality (RSRQ) or a PC5 reference signal strength indication (RSSI).

7. A first user equipment (UE), comprising:

at least one processor configured to:

receive, via a receiver, serving cell information of a relay;

send, via a transmitter to a base station, a message including relay-associated information comprising a relay identifier, the serving cell information of the relay, and measurement information of the relay, the measurement information comprising a PC5 reference signal received power (RSRP);

receive, via the receiver, path switching configuration information from the base station, wherein the path switching configuration information comprises path switching criteria and switching instruction information, the path switching criteria comprising at least one of a first threshold of link quality of a first link and a threshold of PC5 interface link quality of a second link, the switching instruction information comprising the relay identifier; and switch a communication link with the base station from the first link to the second link in response to the path switching criteria being met, wherein the first link is for direct communication with the base station and the second link is for communication with the base station through the relay, wherein the path switching criteria being met comprises at least one of the link quality of the first link being lower than the first threshold of the link quality or the PC5 interface link quality of the second link being higher than the threshold of the PC5 interface link quality of the second link.

8. The first UE of claim 7, wherein the switching instruction information comprises at least one of handover indication, a handover service type, a handover protocol data unit (PDU) session identifier, a handover data radio bearer (DRB), a handover quality of service (QoS) flow information, or a DRB packet data convergence protocol (PDCP) retransmission instructions.

9. The first UE of claim 7, wherein the path switching criteria further includes a service type of the first link.

10. The first UE of claim 9, wherein the path switching criteria is met when the service type of the first link is a first preset service type.

11. The first UE of claim 7, wherein the serving cell information comprises at least one of an E-UTRAN cell global identifier (ECGI), a new radio cell global identifier (NCGI) of a new air interface cell, a base station identifier, a global base station identifier, or a single network slice selection assistance information (S-NSSAI).

12. The first UE of claim 7, wherein the measurement information further comprises a PC5 reference signal received quality (RSRQ) or a PC5 reference signal strength indication RSSI).

* * * * *